US008550505B2

(12) United States Patent
Nuss et al.

(10) Patent No.: US 8,550,505 B2
(45) Date of Patent: Oct. 8, 2013

(54) ACCESSORY FOR A MOTOR-VEHICLE INTERIOR, IN PARTICULAR AN ARMREST FOR A MOTOR-VEHICLE SEAT

(75) Inventors: Ralph Nuss, Poppenricht (DE); Erwin Himmelhuber, Sulzbach-Rosenberg (DE); Daniel Zeitler, Regensburg (DE)

(73) Assignee: Grammer AG, Amberg (DE)

( * ) Notice: Subject to any disclaimer, the term of this patent is extended or adjusted under 35 U.S.C. 154(b) by 517 days.

(21) Appl. No.: 12/436,234

(22) Filed: May 6, 2009

(65) Prior Publication Data

US 2009/0284034 A1    Nov. 19, 2009

(30) Foreign Application Priority Data

May 15, 2008  (DE) .......................... 10 2008 023 751

(51) Int. Cl.
*E05C 19/00*    (2006.01)
*E05C 3/04*    (2006.01)

(52) U.S. Cl.
USPC ................................ 292/1; 292/204; 292/300

(58) Field of Classification Search
CPC .... E05B 65/0841; E05B 73/0023; B60R 7/04
USPC ............... 292/204, 300, 1, 95, 114, 137, 157, 292/192; 296/1, 22.34, 37.8, 24.34, 153, 296/1.09
See application file for complete search history.

(56) References Cited

U.S. PATENT DOCUMENTS

| 2,150,715 | A | | 3/1939 | de Falco |
| 2,760,813 | A | * | 8/1956 | Colm ........................... 296/68.1 |
| 3,044,830 | A | * | 7/1962 | Kolle ........................... 297/361.1 |
| 4,146,267 | A | * | 3/1979 | Mori et al. ................. 297/367 R |
| 4,904,003 | A | * | 2/1990 | Yamazaki et al. ............ 292/126 |
| 4,988,134 | A | * | 1/1991 | Vidwans et al. .............. 292/198 |
| 5,702,157 | A | * | 12/1997 | Hurite ....................... 297/411.38 |
| 6,997,494 | B2 | * | 2/2006 | Neumann .................... 296/1.09 |
| 7,537,268 | B2 | * | 5/2009 | Becker et al. ................. 296/153 |
| 7,726,607 | B2 | * | 6/2010 | Schumacher et al. .... 244/122 R |
| 7,748,769 | B2 | * | 7/2010 | Sommer et al. ............... 296/153 |
| 2004/0164577 | A1 | * | 8/2004 | Shabana et al. ............. 296/1.09 |

FOREIGN PATENT DOCUMENTS

| DE | 3541525 A1 | 5/1987 |
| DE | 29722158 U1 | 5/1999 |
| DE | 10356293 | 6/2005 |

* cited by examiner

*Primary Examiner* — Carlos Lugo
*Assistant Examiner* — Nathan Cumar
(74) *Attorney, Agent, or Firm* — Andrew Wilford

(57) ABSTRACT

A motor-vehicle armrest has a base fixed on the vehicle and defining an axis and an armrest part pivotal on the base about the axis and having a first concave surface turned radially inward toward a second convex surface of the base. A wedge-shaped sprag is slidable between the surfaces generally angularly of the axis between a locking position in which the armrest part is arrested relative to the base and a release position in which pivoting of the armrest part with respect to the base is possible. The sprag has a first contact face cooperating with the first surface of the armrest part and a second nonparallel contact face cooperating with the second surface of the base. The sprag is biased into the locking position and can be moved into the release position.

7 Claims, 7 Drawing Sheets

ACCESSORY FOR A MOTOR-VEHICLE INTERIOR, IN PARTICULAR AN ARMREST FOR A MOTOR-VEHICLE SEAT

CROSS-REFERENCE TO RELATED APPLICATIONS

This application claims the priority of German patent application 10 2008 023 751.5-16 filed 15 May 2008.

FIELD OF THE INVENTION

The invention relates to an accessory for a motor-vehicle interior, in particular an armrest for a motor-vehicle seat, the accessory being pivotal on a base element fixed on the vehicle and comprising a freewheel with at least one sprag movable between a locking position in which the accessory is arrested relative to the base element and a release position in which pivoting of the accessory with respect to the base element is possible, the sprag being provided with a first contact face cooperating with a first counter-surface of the accessory and a second contact face with a second counter-surface of the base element.

Such an accessory is known from DE 103 56 293. This document relates to a pivotal armrest. The pivot range of the armrest is divided into three parts. The armrest has a freewheel that enables movement of the armrest in one direction and prevents movement in the opposite direction in specific angular ranges. The freewheel has sprags that can shift between a locking position and a release position. The sprags are formed by rollers that are in contact with an outer ring and an inner ring of the freewheel.

This prior art has disadvantages, to the extent that the freewheel is expensive to manufacture and could be improved with respect to the locking and release performance.

OBJECT OF THE INVENTION

The object of the invention is to provide an equipping part that costs less to manufacture and has improved properties with respect to its handling.

SUMMARY OF THE INVENTION

The basis of the invention is that the sprag with the first and second contact faces rests on a counter-surface. The first contact face cooperates with a first counter-surface, and the second contact face cooperates with a second counter-surface. The first contact face and the first counter-surface and/or the second contact face and the second counter-surface are complementarily shaped. This creates large contact faces via which forces can be transferred.

According to the invention the first contact face cooperates with the first counter-surface and the second contact face cooperates with a second counter-surface. The first contact face and the first counter-surface thus form a first surface pair, while the second contact face and the second counter-surface form a second surface pair. The first surface pair and the second surface pair are in contact in the locking position. In the release position the first or the second surface pair can for example be out of contact.

The first surface pair and/or the second surface pair are complementarily shaped. In terms of the invention "complementarily shaped" means that the first contact face and the first counter-surface are shaped such that the surfaces can shift substantially in full-surface frictional contact. In addition or alternatively, the second contact face and the second counter-surface can also be shaped such that they can be moved in full-surface frictional contact. If for example the gap between the first counter-surface and the second counter-surface is wedge-shaped, then the first and the second contact face can be arranged at an angle to one another, corresponding to the wedge shape of the gap.

In the prior art the cooperating surfaces had only point contact or line contact for example due to varying radii of the surfaces. In the locking position, substantial surface pressures therefore result from the freewheels from the prior art on the first and second counter-surface. Designing the components comprising the counter-surfaces was accordingly necessary, so that larger forces could be absorbed.

The advantage of the invention is that use of the freewheel configured as per the invention, in particular by the arrangement and forming of the bearing surfaces and counter-surfaces, produces a construction resulting in favorable locking or release performance of the freewheel. The freewheel can also be manufactured particularly cost-effectively. The surface pressure is minimal due to the large-surface contact between the first contact face and the first counter-surface or second contact face and second counter-surface. Demands on the clamping surfaces can therefore be less. For instance, the first counter-surface and/or the second counter-surface can be unhardened. Also, the first and/or the second contact face can be unhardened. In particular the components on which the counter-surfaces are arranged can also be designed for less surface pressure, since the forces are distributed over a larger surface.

According to a first embodiment, a release device is provided that can move the sprag into the release position. The release device is movable between an active position and a release position. In the active position the sprags can be moved by pivoting of the accessory in the locking position. In the release position the sprags are moved by the release device into the release position. The release device can comprise for example individual release elements that each move a sprag from the locking position into the release position. Actuating the release device can be done for example automatically and/or manually.

According to another embodiment a counter-surface is formed by a concave inner surface of a substantially cylindrical inner surface of a first component and another counter-surface is formed by a convex outer face of a second component. The surface can be formed for example by a sleeve fixed on the accessory or connected to the accessory. The inner surface of the sleeve can form the concave limiting surface. The convex outer face can be formed for example by a base element fixed in the motor vehicle, which, depending on the number of sprags, forms one or more outer faces. If the freewheel for example has three sprags the base element can comprise three outer faces. The outer faces can be formed by three-dimensional surfaces that can be shaped depending on preferred locking and release performance.

According to another embodiment the sprag is arranged in a gap formed radially between the first counter-surface and the second counter-surface. The clamping gap is limited by the first counter-surface and the second counter-surface. The clamping gap can taper like a wedge angularly for example with respect to the pivot axis of the accessory. The clamping gap can for example be shaped as a bent wedge. According to another configuration of the invention the sprag is shaped wedge-shaped. If the sprag for example corresponding to the clamping gap is wedge-shaped or bent wedge-shaped, a large first and second contact face on the sprag can be shaped such that is in full surface contact with the counter-surface.

According to another embodiment the sprag is biased by a spring into the locking position. Due to the biasing of the sprag with a spring a normal force, which generates a friction force, can be exerted constantly on the first and/or the second counter-surface.

Another embodiment is characterized in that a coefficient of friction of $0.8 < F_R$ is provided between the first contact face and the first counter-surface. With relatively minimal normal force a relatively high friction force is generated due to the large coefficients of friction. The sprag is also moved by a high coefficient of friction at minimal normal force due to the resulting friction force from the equipping part. The normal force can be generated for example by a spring.

Another embodiment is characterized in that a coefficient of friction of $0 < F_R < 0.3$ is provided between the second contact face and the second counter-surface. Since the coefficient of friction is minimal, a relatively minimal friction force occurs also at a relatively high normal force. A relatively high normal force accordingly causes sliding friction between the sprag and the counter-surface such that slight movement of the armrest body is possible and it does not get stuck.

According to another embodiment a control device is provided that can move the release device between the locking position and the release position, depending on the angular position of the accessory. In at least one angle range the control device can allow movement of the accessory from the locking position to the release position. If the accessory is formed for example by an armrest, it is possible for example in an angle range comprising a plurality of substantially horizontal use positions and in an angle range comprising a plurality of substantially vertical out-of-use positions for the control device to cooperate with the release device such that movement in one direction is possible, but movement in the opposite direction is not possible. In an intermediate angle range the control device can cooperate with the release device such that movement in both pivot directions of the armrest is possible.

According to another configuration of the invention an is actuator is provided that can manually operate the release device. In addition or alternatively to the control device the release device can be moved manually from the locking position to the release position by means of the actuator. Also in angle ranges where the freewheel prevents pivoting of the equipping part in one direction, the locking effect of the freewheels can be reversed by means of this embodiment by tripping the actuator, enabling pivoting in both angular directions.

BRIEF DESCRIPTION OF THE DRAWING

Further advantages of the invention will be seen in the description of an embodiment illustrated in the figures, in which.

DETAILED DESCRIPTION

Figure 1:
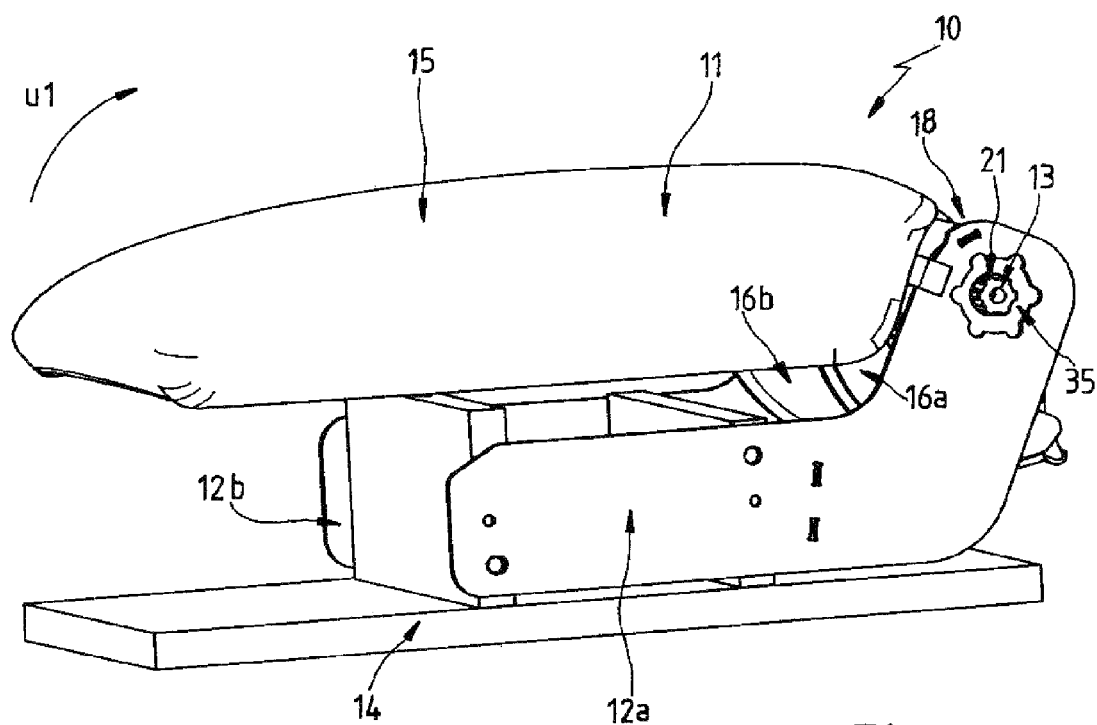
FIG. 1 is a schematic perspective view of the armrest in the use position.

An armrest as a whole is designated in the figures at reference 10. Identical reference numerals in the different is figures also designate corresponding parts by the addition or omission of lower case letters.

The armrest comprises an armrest part 11. The armrest part 11 is provided with a pad 15. The armrest part 11 is pivotal about a pivot axle 13 or a geometric pivot axis s. The armrest part 11 can be moved from the use position illustrated in FIG. 1 in angular direction u1 into the out-of-use position illustrated in FIG. 2. The armrest part 11 can be moved from the out-of-use position illustrated in FIG. 2 in direction u2 to the use position illustrated in FIG. 1. The positions according to FIGS. 1 and 2 represent end positions of the armrest part 11.

The pivot axle 13 is connected solidly to base parts 12a and 12b forming a base element. The base parts 12a and 12b are fixed on a motor-vehicle frame member 14. The pivot axle 13 has splines 21 that engage positively in complementary recesses of bushings 35. The bushings 35 are connected solidly to the base parts 12a and 12b.

Figure 2:
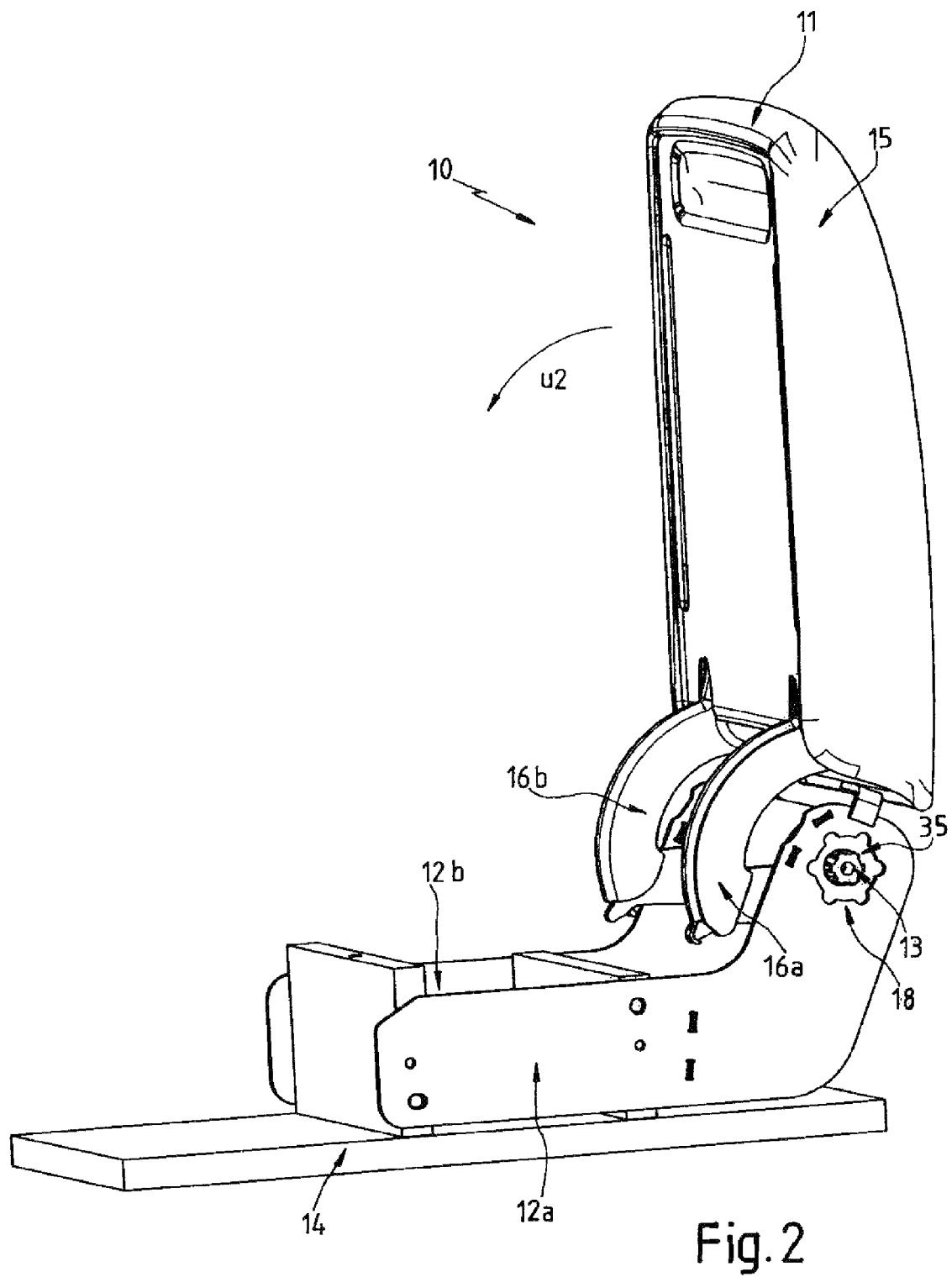
FIG. 2 shows the armrest of FIG. 1 in the out-of-use position.
Figure 3:
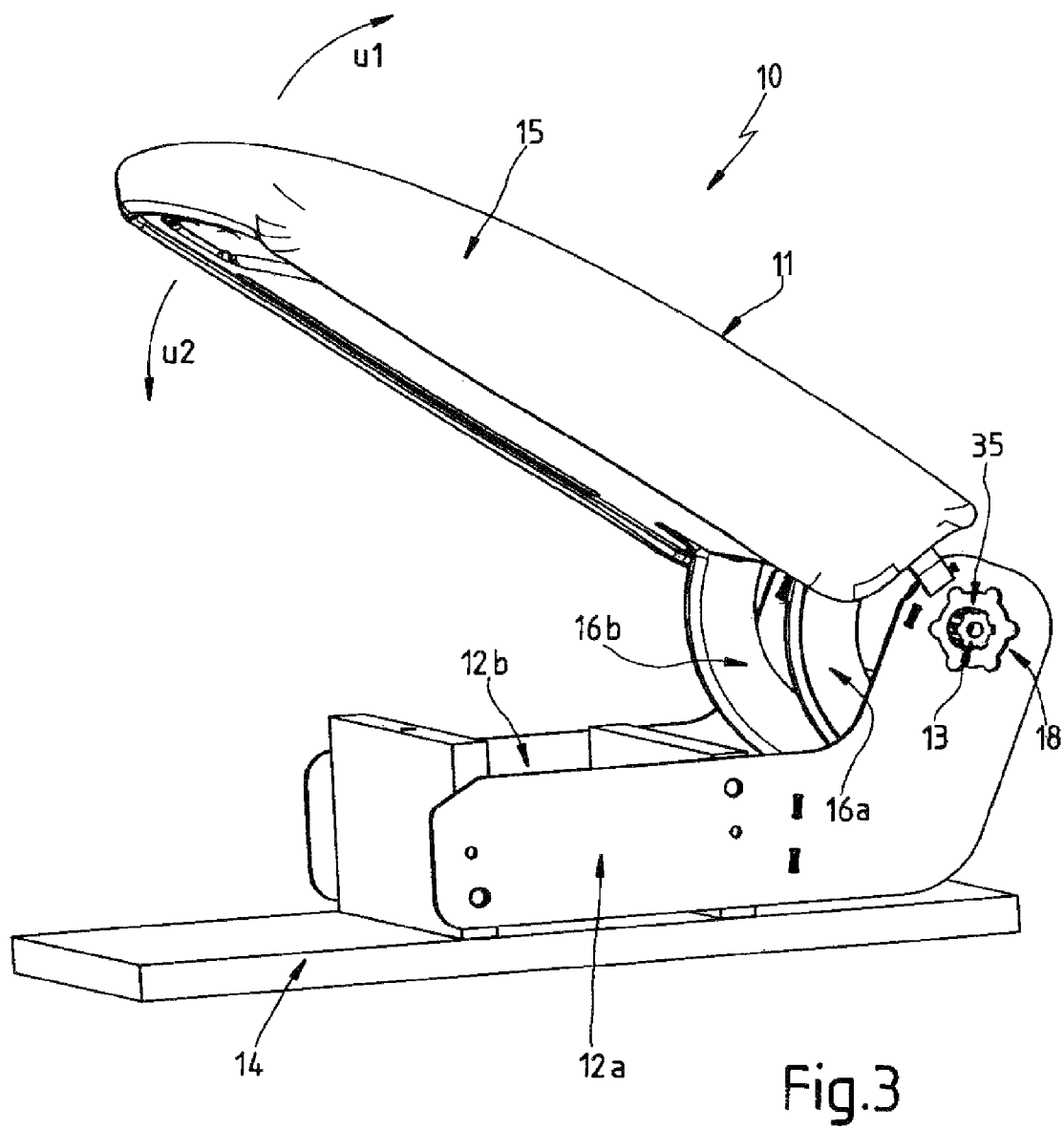
FIG. 3 shows the armrest of FIG. 1 in a first intermediate position.
Figure 4:
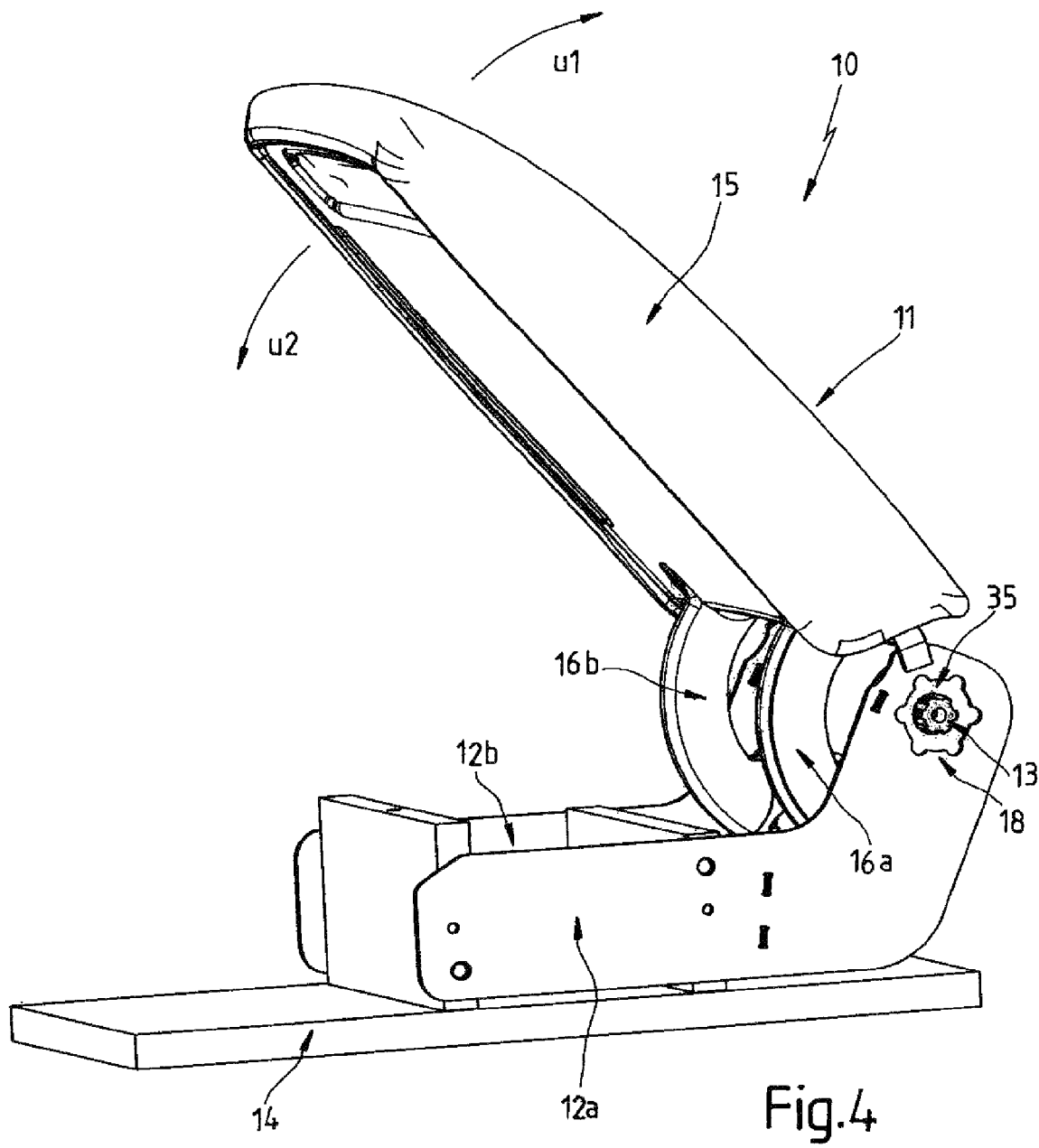
FIG. 4 shows the armrest of FIG. 1 in a second intermediate position.

During pivoting movement in the direction u2 from the out-of-use position according to FIG. 2 to the use position according to FIG. 1 the armrest part is stopped progressively by a freewheel in specific angle ranges. FIG. 3 shows another use position and FIG. 4 shows another out-of-use position by way of example, in which in each case pivoting of the armrest part 11 in direction u2 is not possible due to the freewheel. The freewheel is described in greater detail below.

Figure 5:
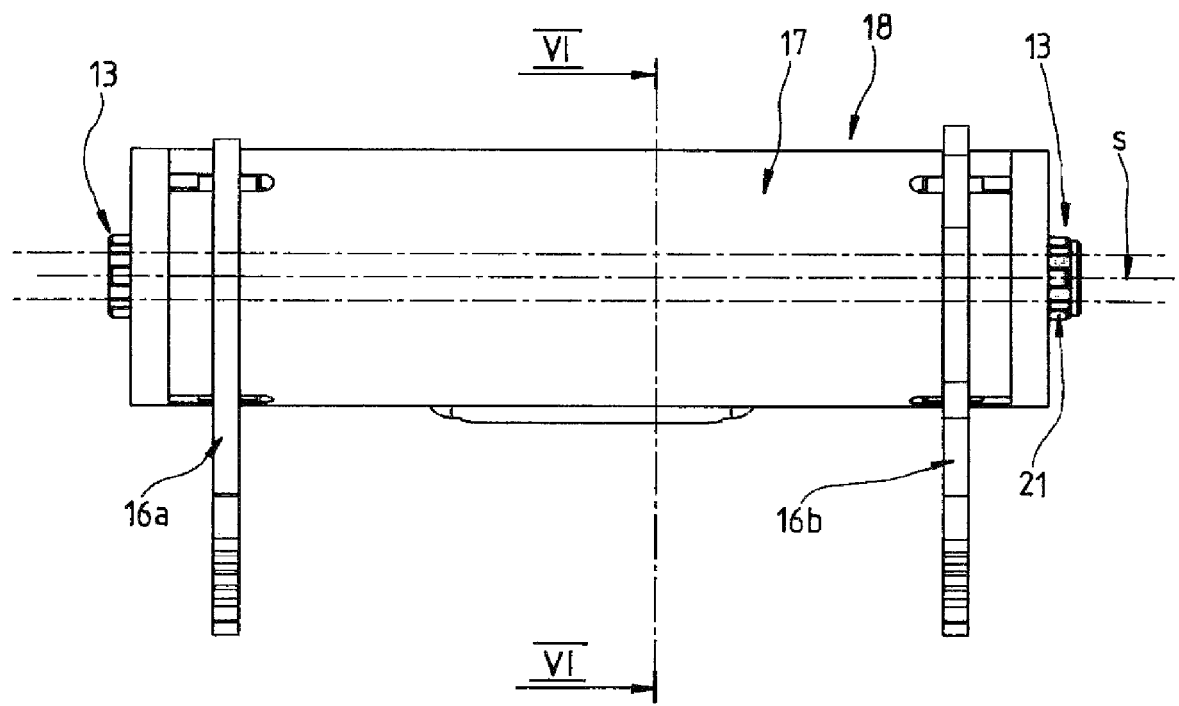
FIG. 5 is a rear view of a pivot of the armrest part.

Two arms 16a and 16b are connected solidly to the armrest part 11. The arm 16a and the arm 16b are fixed to a cylindrical outer sleeve 17 (see FIG. 5), forming the outer ring of the freewheel 18. The sleeve 17 connected to the armrest part 11 according to FIG. 6 can rotate relative to an inner sleeve 19. The inner sleeve 19 has recesses 20 in which the splines 21 of the pivot axle 13 engage. The inner sleeve 19 is rotationally fixed on the pivot axle 13.

Formed between a second counter surface formed by outer faces 23 (of the inner sleeve 19) and a first inner counter surface 22 of the outer sleeve 17 are tapered wedge-shaped gaps 36, in which wedge-shaped sprags 24 are arranged. Each sprag 24 is tapered like the respective gap 36. The sprags 24 can shift relative to the inner sleeve 19 between a locking position (see FIG. 6) and a release position (see FIG. 7). In the release position the sleeve 17 and thus also the armrest part 11 can be swung relative to the inner sleeve 19, while movement of the sleeve 17 relative to the inner sleeve 19 is prevented in the locking position.

Each sprag 24 has an convex first contact face 25 that is in contact with the complementarily arcuately concave inner surface 22 of the sleeve 17. Each convex outer face 23 of the inner sleeve 19 is in contact with a complementary concave second contact face 26 of the sprag 24.

Between the first contact face 25 and the inner surface 22 there is a high coefficient of friction $\mu=1.0$, whereas there is a low coefficient of friction of $\mu=0.2$ between the outer face 23 and the second contact face 26.

Due to the high coefficient of friction a high friction force is generated even at minimal normal force between the first contact face 25 and the inner surface 22. A relatively slight friction force is generated between the second contact face 26 and the outer face 23 due to the minimal coefficients of friction at a corresponding normal force.

The second contact face 26 of the sprag 24 is shaped as a three-dimensional surface. The inclination of the second contact face 26 with respect to the first contact face 25 can be selected such that easy and rapid locking and release of the freewheel occurs. The greater the angle between the second contact face 26 and the first contact face 25 is, the easier the movement of the sprag 24 in the locking position or the release position.

Bearing arms 27, which act as abutments for springs 28 indicated only by a symmetry line, are connected solidly to the inner sleeve 19. Each spring 28 biases a respective one of the sprags 24 in the locking position, i.e. according to FIG. 6 in counterclockwise direction u2.

Each sprag 24 is in contact with a respective actuator 29 of a release device 30. The sprags 24 can be moved clockwise against the spring force of the springs 28 relative to the inner sleeve 19 from the locking position to the release position by means of the release device 30.

Figure 6:
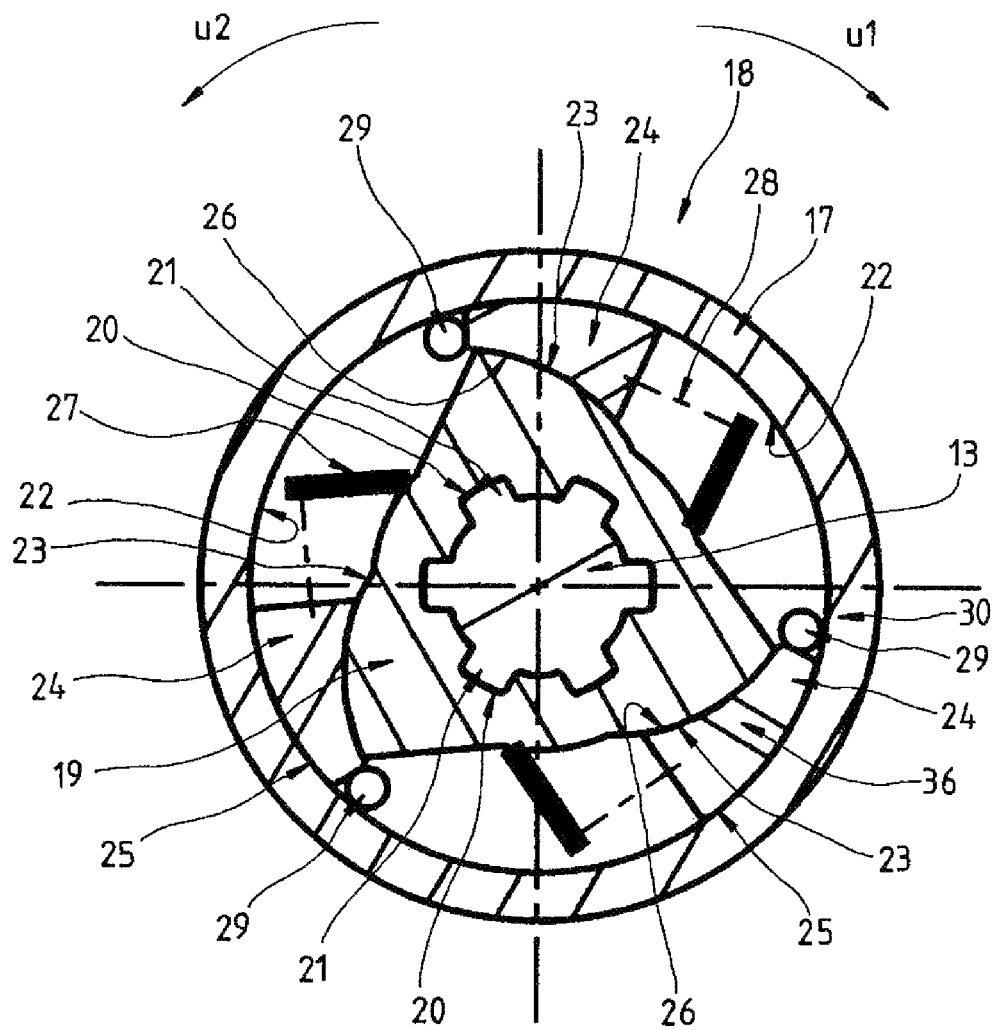
FIG. 6 is a sectional illustration according to section line VI-VI in FIG. 5 with the sprags in the locking position.
Figure 7:
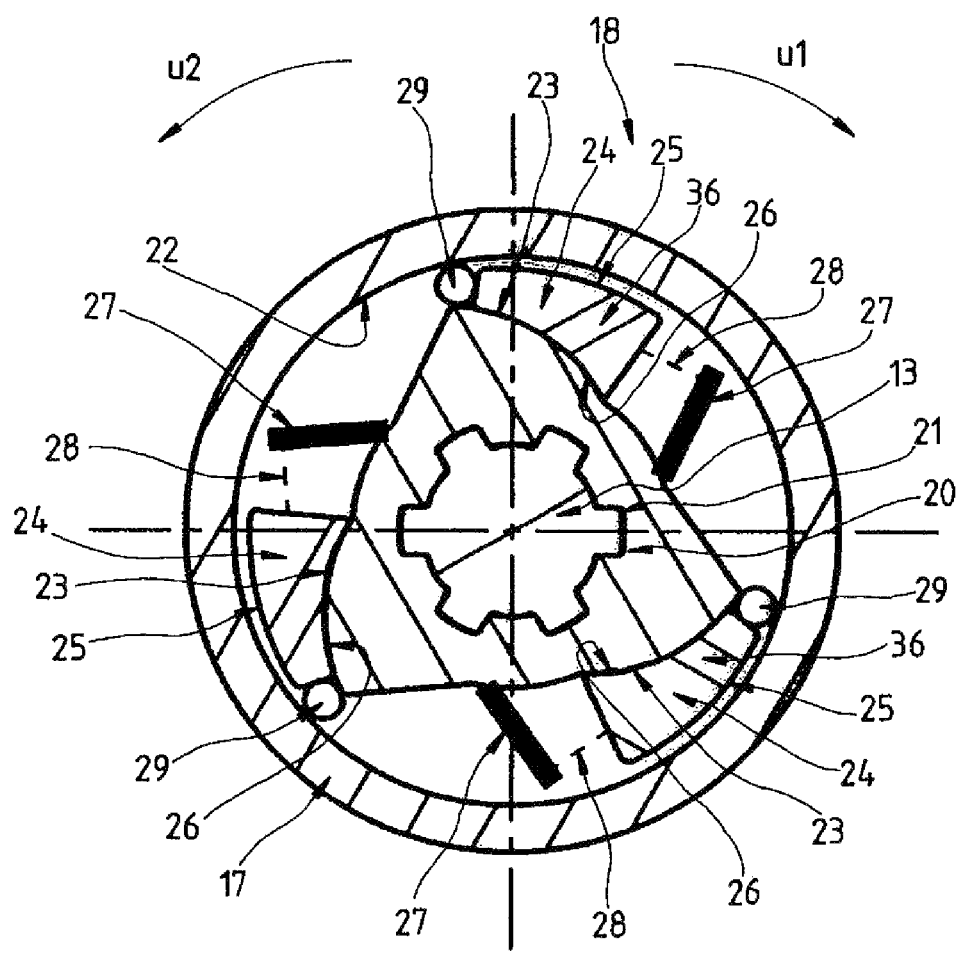
FIG. 7 is a sectional illustration like FIG. 6 with the sprags in the release position.

The release device 30 for example can be moved by a switch, not illustrated, arranged on the armrest part 11 from an active position according to FIG. 6 to a release position according to FIG. 7. In the active position of the release device 30 the sprags 24 are moved to the release position. In the release position of the release device 30 the sprags 24 can move to the locking position when the armrest part 11 is pivoted in direction u2.

Apart from the abovementioned switch, the release device 30 for example can be actuated by a control device, not illustrated. The control device moves the release device 30 automatically in defined angle ranges to the release position or to the active position.

It should also be mentioned that alternatively to the illustrated embodiment the armrest part 11 can be connected unitarily to the inner sleeve 19 and the sleeve 19 to the motor vehicle.

The invention claimed is:

1. An armrest for a motor-vehicle interior, the armrest comprising:
    a base element fixed on the vehicle and defining an axis;
    an armrest part pivotal on the base element about the axis, the armrest part having a first counter surface turned radially toward a second counter surface of the base element, one of the counter surfaces being radially inwardly concave and the other of the counter surfaces being radially outwardly convex;
    at least one wedge-shaped sprag slidable between the to counter surfaces generally angularly of the axis between a locking position in which the armrest part is arrested relative to the base element and a release position in which pivoting of the armrest part with respect to the base element is possible, the sprag being provided with
        a first contact face cooperating with the first counter surface of the armrest part and
        a second contact face cooperating with the second counter surface of the base element, the first counter surface and the second counter surface extending nonparallel to each other and forming a wedge-shaped clamping gap receiving the sprag and clamping the sprag in the locking position;
    biasing means for urging the sprag into the locking position to lock the armrest against rotation;
    release means for moving the sprag into the release position to allow rotation of the armrest; and
    an actuator that can manually actuate the release means.

2. The armrest defined in claim 1 wherein the one counter surface is formed by a concave inner surface of the armrest part and the other counter surface is formed by a convex outer face of the base element.

3. The armrest defined in claim 1, wherein the biasing means is a spring biasing the sprag into the locking position.

4. The armrest defined in claim 1 wherein a coefficient of friction $F_R$ greater than 0.8 is provided between the first contact face and the first counter surface.

5. The armrest defined in claim 1 wherein a coefficient of friction $F_R$ greater than 0 and less than 0.3 is provided between the second contact face and the second counter surface.

6. The armrest defined in claim 1, further comprising:
    a controller that can move the sprag between the locking position and the release position, depending on the angular position of the armrest part.

7. The armrest defined in claim 1, wherein the first contact face is generally complementary to the first counter surface and the second contact face is generally complementary to the second counter surface.

* * * * *